United States Patent
Biedermann et al.

(10) Patent No.: US 11,765,027 B2
(45) Date of Patent: Sep. 19, 2023

(54) ACCESS POINT REGISTRATION IN A NETWORK

(71) Applicant: SOPHOS LIMITED, Abingdon (GB)

(72) Inventors: Balthasar Biedermann, Abingdon (GB); Dirk Bolte, Abingdon (GB); Ye Huang, Abingdon (GB)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 17/994,112

(22) Filed: Nov. 25, 2022

(65) Prior Publication Data
US 2023/0093293 A1   Mar. 23, 2023

Related U.S. Application Data

(63) Continuation of application No. 16/650,326, filed as application No. PCT/GB2018/052361 on Aug. 20, 2018.
(Continued)

(51) Int. Cl.
*H04L 41/0806* (2022.01)
*H04L 41/0853* (2022.01)
(Continued)

(52) U.S. Cl.
CPC ...... *H04L 41/0806* (2013.01); *H04L 41/0853* (2013.01); *H04L 41/0886* (2013.01);
(Continued)

(58) Field of Classification Search
CPC ............. H04L 41/0806; H04L 41/0853; H04L 41/0886; H04L 41/0809; H04W 12/06; H04W 12/63; H04W 60/00; H04W 84/12
See application file for complete search history.

(56) References Cited

U.S. PATENT DOCUMENTS

2009/0232311 A1  9/2009  Meier
2014/0334334 A1  11/2014 Brzozowski et al.
(Continued)

FOREIGN PATENT DOCUMENTS

WO   WO 2017/039769   3/2017

OTHER PUBLICATIONS

PCT, "International Search Report and Written Opinion in International Application No. PCT/GB2018/052361, filed Aug. 20, 2018", dated Nov. 21, 2018.

*Primary Examiner* — Charles N Appiah
*Assistant Examiner* — Frank E Donado
(74) *Attorney, Agent, or Firm* — IP Spring

(57) ABSTRACT

Implementations generally relate methods, systems, and computer readable media for providing automatic access point registration. In some implementations, a method includes receiving an indication of automatic device onboarding activation. The method further includes receiving a selection of one or more reference devices. The method further includes determining one or more detectable devices of the one or more candidate devices to be onboarded that are detectable by at least one of the one or more reference devices. The method further includes obtaining one or more automatic configuration parameters from one or more of the reference devices. The method further includes configuring one or more of the detectable devices to be onboarded with the one or more automatic configuration parameters.

20 Claims, 6 Drawing Sheets

Related U.S. Application Data

(60) Provisional application No. 62/562,889, filed on Sep. 25, 2017.

(51) Int. Cl.
*H04L 41/08* (2022.01)
*H04W 12/06* (2021.01)
*H04W 60/00* (2009.01)
*H04W 12/63* (2021.01)

(52) U.S. Cl.
CPC ............ *H04W 12/06* (2013.01); *H04W 12/63* (2021.01); *H04W 60/00* (2013.01)

(56) References Cited

U.S. PATENT DOCUMENTS

| | | |
|---|---|---|
| 2015/0049616 A1 | 2/2015 | Duncan |
| 2015/0201370 A1 | 7/2015 | Desai |
| 2016/0134469 A1 | 5/2016 | Carter et al. |
| 2016/0240044 A1 | 8/2016 | Nguyen |
| 2016/0337180 A1 | 11/2016 | Rao |
| 2017/0026335 A1 | 1/2017 | Dhulipala |
| 2017/0070390 A1* | 3/2017 | Poola ................... H04W 8/005 |
| 2017/0201585 A1 | 7/2017 | Doraiswamy |
| 2017/0339728 A1 | 11/2017 | Lee et al. |
| 2017/0374692 A1 | 12/2017 | Currie |
| 2018/0063714 A1 | 3/2018 | Stephenson |
| 2018/0167812 A1 | 6/2018 | Nagarajamoorthy et al. |

* cited by examiner

ACCESS POINT REGISTRATION IN A NETWORK

RELATED APPLICATIONS

This application is continuation application of U.S. application Ser. No. 16/650,326, filed Mar. 24, 2020, which is a national phase of International Application No. PCT/GB2018:052361, filed Aug. 20, 2018, which claims priority to U.S. Provisional Application No. 62-562,889, filed Sep. 25, 2017, the contents of which are incorporated herein by reference in their entirety.

BACKGROUND

In network environments, securing a mission critical network such as a network of Internet of Things (or IoT) devices is a concern. A variety of endpoint security solutions with a firewall may apply security polices at different network segments. If a network environment has several access points but has a dead zone, a new access point can be added in order to cover the dead zone area. The new access point should be added in a secure manner. As such, security is a substantial challenge in providing networks.

SUMMARY

Implementations generally relate to methods, systems, and computer readable media for providing automatic access point registration. In some implementations, a method includes receiving, at a device configuration system, an indication of automatic device onboarding activation, where the indication includes identification information of one or more candidate devices to be onboarded. The method further includes receiving, at the device configuration system, a selection of one or more reference devices. The method further includes determining, by the device configuration system, one or more detectable devices of the one or more candidate devices to be onboarded, where the one or more detectable devices are candidate devices that are detectable by at least one of the reference devices. The method further includes obtaining, at the device configuration system, one or more automatic configuration parameters from one or more of the reference devices. The method further includes configuring, by the device configuration system, one or more of the detectable devices to be onboarded using the one or more automatic configuration parameters.

With further regard to the method, in some implementations, the one or more reference devices include one or more of a configured access point, hub, switch, and firewall, or a combination device thereof. In some implementations, the one or more reference devices include at least one configured access point located in network proximity to one or more of the candidate devices. In some implementations, one or more of the detectable devices to be onboarded include at least one access point. In some implementations, the one or more automatic configuration parameters include assigned networks. In some implementations, the method further includes receiving, at the device configuration system, one or more manual configuration parameters; and configuring, via the device configuration system, the one or more detectable devices to be onboarded with one or more of the manual configuration parameters. In some implementations, the configuring includes updating a value of one or more local settings in one or more of the detectable devices to be onboarded. In some implementations, to determine the one or more detectable devices of the one or more candidate devices to be onboarded, the method further includes: sending a command to one or more of the reference devices to detect the one or more candidate devices to be onboarded; and, in response, receiving one or more responses from the one or more reference devices, where each response indicates if one or more of the candidate devices are detected. In some implementations, the identifying includes omitting at least one candidate device that is not detectable by the one or more reference devices.

In some implementations, a system includes one or more processors coupled to a computer-readable medium having stored thereon software instructions that, when executed by the one or more processors, cause the one or more processors to perform operations including receiving, at a device configuration system, an indication of automatic device onboarding activation, where the indication includes identification information of one or more candidate devices to be onboarded; receiving, at the device configuration system, a selection of one or more reference devices; determining, by the device configuration system, one or more detectable devices of the one or more candidate devices to be onboarded, where the one or more detectable devices are candidate devices that are detectable by at least one of the reference devices; obtaining, at the device configuration system, one or more automatic configuration parameters from one or more of the reference devices; and configuring, by the device configuration system, one or more of the detectable devices to be onboarded using the one or more automatic configuration parameters.

With further regard to the system, in some implementations, the one or more reference devices include one or more of a configured access point, hub, switch, and firewall, or a combination device thereof. In some implementations, the one or more reference devices include at least one configured access point located in network proximity to one or more of the candidate devices. In some implementations, one or more of the detectable devices to be onboarded include at least one access point. In some implementations, the one or more automatic configuration parameters include assigned networks. In some implementations, the operations further include: receiving, at the device configuration system, one or more manual configuration parameters; and configuring, via the device configuration system, the one or more detectable devices to be onboarded with one or more of the manual configuration parameters. In some implementations, the configuring includes updating a value of one or more local settings in one or more of the detectable devices to be onboarded. In some implementations, to determine the one or more detectable devices of the one or more candidate devices to be onboarded, the method further includes: sending a command to one or more of the reference devices to detect the one or more candidate devices to be onboarded; and, m response, receiving one or more responses from one or more of the reference devices, where each response indicates if one or more of the candidate devices are detected. In some implementations, the identifying includes omitting from a list of detectable devices to be onboarded at least one candidate device that is not detectable by the one or more reference devices.

In some implementations, a non-transitory computer-readable storage medium having stored thereon instructions that, when executed by one or more processors, cause the one or more processors to perform operations including receiving, at an automatic configuration system, an indication of automatic device onboarding activation, where the indication includes identification information of one or more candidate devices to be onboarded, receiving, at the device configuration system, a selection of one or more reference devices; determining, by the device configuration system, one or more detectable devices of the one or more candidate devices to be onboarded, where the one or more detectable devices are candidate devices that are detectable by at least one of the reference devices; obtaining, at the device configuration system, one or more automatic configuration parameters from one or more of the reference devices; and configuring, by the device configuration system, one or more of the detectable devices to be onboarded using the one or more automatic configuration parameters.

With further regard to the computer-readable storage medium, in some implementations, one or more of the reference devices include one or more of a configured access point, hub, switch, and firewall, or a combination device thereof.

DETAILED DESCRIPTION

Implementations generally relate to methods, systems and computer readable media for providing automatic access point registration based on neighborhood detection. Implementations described herein are described generally in the context of network devices and network security devices such as gateways, hubs, switches, firewalls, and wireless access points (APs), and generally relates to security policies. Implementations enable new network devices (e.g., devices that were previously not connected to the network) to be automatically registered to a network in a secure manner.

Implementations provide a safe propagation method to automatically onboard multiple new devices (e.g., access points) located in the same network. Implementations also reduce the amount of information a customer user has to provide in order to configure the new network device.

While some implementations are described herein in the context of WLANs, these implementations and others may also apply to local area networks (LANs) and radio frequency (RF) technologies. For example, techniques described herein may be implemented on any layer 2 (L2) network device, including hubs and switches.

While some implementations may be applied in a cloud management system, these implementations and other may be applied in an on-premise device.

In some implementations, a system, such as a device configuration system, receives an indication of automatic device onboarding activation, where the indication includes identification information of one or more candidate devices to be onboarded. The system also receives a selection of one or more reference devices. The system determines one or more detectable devices of the one or more candidate devices to be onboarded, where the one or more detectable devices are candidate devices that are detectable by at least one of the reference devices. The system also obtains one or more automatic configuration parameters from one or more of the reference devices. The system also configures one or more of the detectable devices to be onboarded using the one or more automatic configuration parameters. In various implementations, the system may configure the one or more detectable devices based on various security policies for configuring devices with permissions, access, rules, and settings associated with traffic, content, packets, data, applications, devices, and other network aspects.

As described in more detail herein, a security policy may be a configuration or setting that configures a device with permissions, access, rules, and settings associated with traffic, content, packets, data, applications, devices, and other network aspects.

Figure 1:
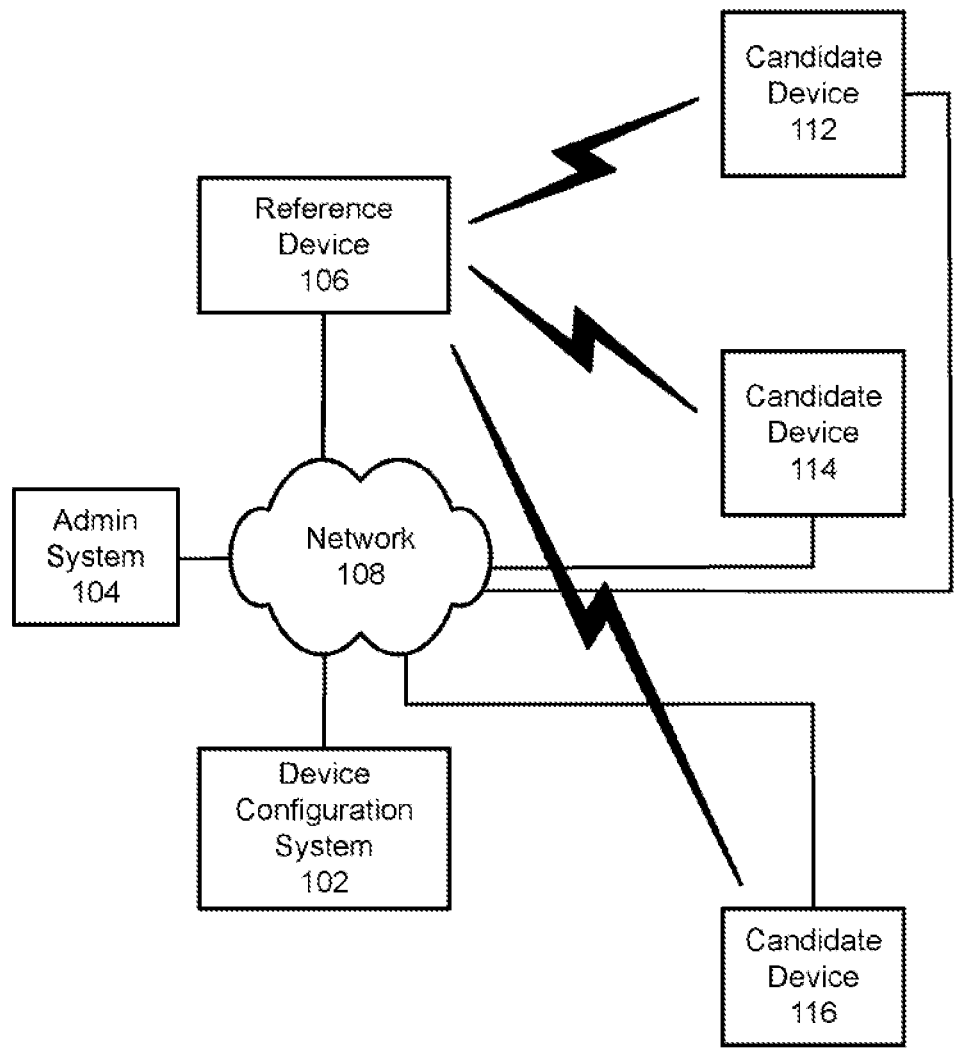
FIG. 1 illustrates a block diagram of an example network environment, which may be used for some implementations described herein.

FIG. 1 illustrates a block diagram of an example network environment 100, which may be used for some implementations described herein. The environment 100 includes a device configuration system 102, an administrator system 104 (labeled admin system 104), a reference device 106, a network 108, and candidate devices 112, 114, and 116.

In various implementations, the device configuration system 102, the admin system 104, reference device 106, the candidate devices 112, 114, and 116, and other network devices (not shown) communicate via the network 108. In various implementations, the network 108 may include one or more networks (e.g., 802.11 networks, Wi-Fi, Bluetooth, etc.).

In various implementations, the reference device 106 may be a wireless access point (AP), a hub, a switch, a firewall, or a combination device thereof. In various implementations, a combination device may be a device that combines functionalities of an AP, hub, switch, and/or firewall. For example, a combination device may be an AP and a firewall, an AP and a switch, etc. Similarly, the candidate devices 112, 114, and 116 may be wireless APs, hubs, or switches, client devices, or combinations thereof.

As described in more detail herein, the device configuration system 102 automatically configures new network devices to be connected to or onboarded onto the network environment 100. The administrator system 104 may provide access to a system administrator user who may be responsible for the upkeep, configuration, and reliable operation of network devices in the network environment 100.

For ease of illustration, FIG. 1 shows one block for each of the device configuration system 102, the administrator system 104, the reference device 106, the network 108, and the candidate devices 112, 114, and 116. Any of the blocks 102 through 116 may represent multiple devices. For example, there may be any number of reference devices, candidate devices, etc. In some implementations, the wireless network environment 100 may not have all of the components shown and/or may have other elements including other types of elements instead of, or in addition to, those shown herein.

In various implementations, users may interact with each other or with other systems using the respective client devices. In various implementations, client devices may be a desktop computer, laptop computer, tablet, mobile telephone. Internet of Things (IoT) devices or any other suitable device. In various implementations, client devices may interact with each other as IoT devices or may interact with other systems such as or via the reference device or other AP-hub/switch. IoT devices may include devices in an office environment, home environment, and other locations. For example, IoT devices may include printers, shredders, fax machines, smoke detectors, fire alarms, locks, security cameras, proximity sensors, smart appliances, microwaves, stoves, refrigerators, food processors, thermostats, locks, etc.

In operation, as indicated herein, the device configuration system 102 automatically configures new network devices to be connected to or onboarded to the network environment 100. In some implementations, the device configuration system 102 may determine threat levels for each network device to be onboarded onto the network environment 100. In various implementations, the threat level may be based on various factors such as physical communication layer characteristics (e.g., RF characteristics, etc.) of each of corresponding connected client device. In various implementations, the RF characteristics for the client devices may be detected by a reference device (e.g., AP/hub/switch, etc.) such as reference device 106.

In some implementations, the network environment 100 may also include a device security system (not shown), which may be a separate device or integrated into another device, such as the AP/hub/switch.

Figure 2:
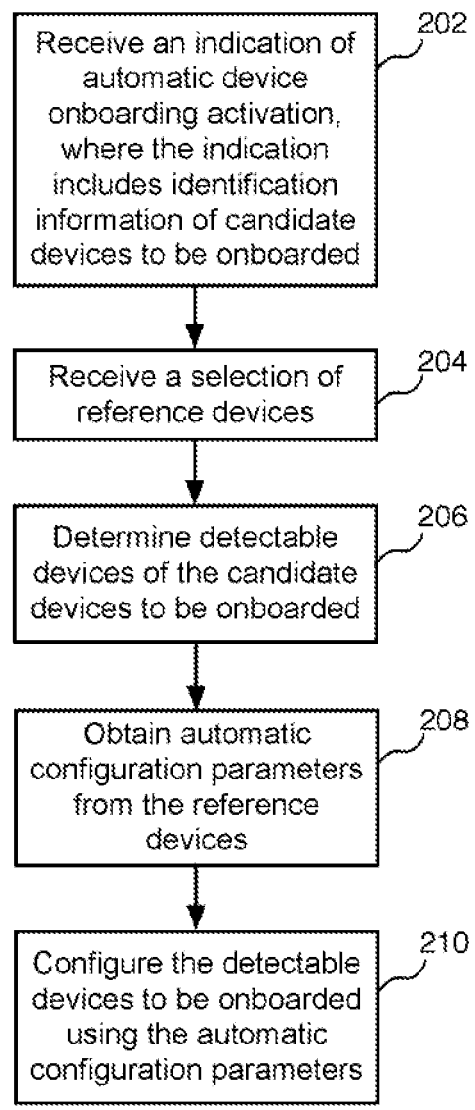
FIG. 2 illustrates a flowchart showing an example method for providing automatic access point registration, according to some implementations.

FIG. 2 illustrates a flowchart showing an example method for providing automatic access point registration, according to some implementations. Referring to FIGS. 1 and 2, a method is initiated at 202, where the system, such as device configuration system 102, receives an indication of automatic device onboarding activation. In various implementations, the indication includes identification information of one or more candidate devices to be onboarded. In various implementations, the identification information may include MAC addresses, or other identifier.

In some implementations, the indication of automatic device onboarding activation may be triggered by an attempt and/or request from a candidate device such as candidate devices 112, 114, and 116 to join the network environment or more specifically, the network 108. In some implementations, the request may include identifying information about the requesting device. In various implementations, the candidate devices 112, 114, and 116 may send requests to join the network, which are forwarded to the device configuration system 102. In some implementations, the network links may be wireless links, wired links, or combinations thereof. In various implementations, the candidate devices 112, 114, and 116 may be wireless APs, hubs, switches, client devices, or combinations thereof.

At 204, the system receives a selection of one or more reference devices, such as reference device 106. In some implementations, the selection reference devices may be from a list of existing network devices on the network that are already registered and configured. These reference devices have already established an initial trust/reliability level. In some implementations, one or more of the reference devices may include at least one configured access point. As indicated herein, in various implementations, a reference device may be a wireless AP, a hub, a switch, a firewall, or a combination device thereof, or other network device.

In some implementations, one or more of the reference devices may include at least one configured access point located in network proximity to one or more of the candidate devices (e.g., a reference device can reach a candidate device using local communication).

In some implementations, one or more of the reference devices may include at least one configured access point located in geographic proximity to a predetermined location. For example, the geographic proximity may be based on the distance of the reference device from other network devices In some implementations, the geographic proximity may be based on the distance of the reference device from other reference devices. In some implementations, the geographic proximity may be based on the distance of the reference device from one or more candidate devices. In some implementations, network devices that fall within a predetermined distance (e.g., 1000 feet, 3000 feet, etc.) from the network 108 may be potential reference devices. In some implementations, network devices that fall outside a predetermined distance (e.g., 1000 feet, 3000 feet, etc.) from the network 108 may be have a higher degree of risk and thus may be excluded as potential reference devices. The particular distance may vary, and will depend on the specific implementation.

At 206, the system determines one or more detectable devices of the one or more candidate devices to be onboarded, where the one or more detectable devices are candidate devices that are detectable by at least one of the reference devices. In some implementations, one or more of the detectable devices to be onboarded may include at least one access point. As indicated herein, the detectable devices to be onboarded may include wireless APs, hubs, switches, client devices, or combinations thereof.

In various implementations, the system may utilize one or more of the reference devices to find and securely identify one or more of the candidate devices. The reference devices may find and securely identify candidate devices using various techniques. For example, in some implementations, a reference device may find and identify one or more candidate devices that come from the same source IP as the reference device. In some implementations, a reference device may find and identify one or more candidate devices by capturing dynamic host configuration protocol (DHCP) information from the candidate devices.

In some implementations, a reference device may find and identify one or more candidate devices by using network mechanisms such as address resolution protocol (ARP) and Reverse Address Resolution Protocol (RARP), ping, and other techniques. While these detections indicate that devices are within the same network, these detections provide a reasonable level of security as an attacker needs to be in physical proximity to the reference device.

In some implementations, a mechanism may be enriched to ensure that a candidate device is truly within the same network of the reference device by implementing a custom protocol which only works on link-local, using the reference device as trust broker. This may be achieved in various ways.

For example, in some implementations, a management system may answer a request to join the network with an encrypted temporary token and then redirect candidate device to a reference device. The candidate device may then connect to reference device with the token. The reference device may then validate the token at the management system, which in turn returns validation token. The reference device may then redirect the candidate device with validation token to the management system. The candidate device registers again at management system with validation token. Alternatively, a reference device may set up a temporary (tenant-independent) heartbeat channel.

As described in more detail herein, the system may generate a list of identified candidate devices to be onboarded that are detectable by at least one of the reference devices. In various implementations, the candidate devices to be onboarded, if detectable, may also be referred to as detectable candidate devices or detectable devices.

Example implementations directed to the determination of detectable devices are described in more detail below in connection with FIG. 3.

At 208, the system obtains one or more automatic configuration parameters from one or more of the reference devices. In some implementations, the automatic configuration parameters may include assigned networks. The particular automatic configuration parameters may vary, and will depend on the particular implementation. For example, the automatic configuration parameters may include tenant information (e.g., ownership of the AP), WLAN configuration (e.g., SSIDs, VLANs, hotspot, schedules), security configuration (e.g., firewall rules, quality of service rules), firmware version and package, and signal strength.

In some implementations, factors that may influence automatic configuration parameters may include neighborhood (e.g., different reference devices might have different configurations), device types (e.g., AP vs. switch), and device capabilities (e.g., ports, WLAN bands).

In some implementations, the system may receive one or more manual configuration parameters. In some implementations, manual configuration parameters may be provided by an administration user via administration system 104 of FIG. 1. In some implementations, one or more of the manual configuration parameters include channel selection, device name, etc.

At 210, the system configures one or more of the detectable devices to be onboarded using the one or more automatic configuration parameters. In some implementations, the system may also configure one or more of the detectable devices to be onboarded with one or more of the manual configuration parameters, if any.

In some implementations, to configure the detectable devices, the system may update the value of one or more local settings in one or more of the detectable devices to be onboarded.

In various implementations, the system may applies one or more security policies for configuring detectable device with permissions, access, rules, and settings associated with traffic, content, packets, data, applications, or devices. Such security policies determine with actions a device may be allowed or not allowed to take. In various implementations, a security policy applies one or more rules for allocating one or more network resources. A security policy may involve one or more rules. Also, a security policy may include a group of policies, allowed/blocked ports, allowed/blocked client devices, and allowed/blocked applications.

Figure 3:
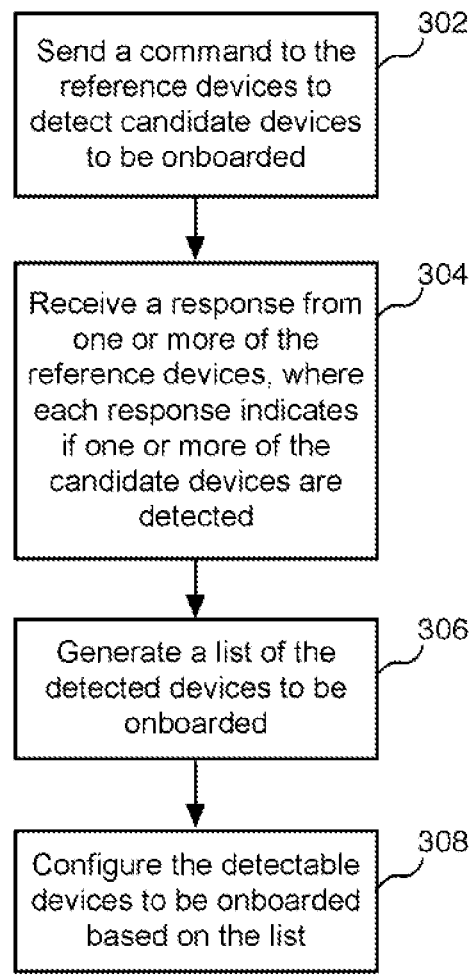
FIG. 3 illustrates a flowchart showing an example method for determining detectable devices among candidate devices to be onboarded, according to some implementations.

FIG. 3 illustrates a flowchart showing an example method for determining detectable devices among candidate devices to be onboarded, according to some implementations. As indicated herein, in various implementations, the system may determine detectable candidate devices to be onboarded using a reference device, such as reference device 106, or a group of reference devices. Referring to FIGS. 1 and 3, a method is initiated at 302, where the system, such as device configuration system 102, sends a command to one or more of the reference devices to detect the one or more candidate devices to be onboarded.

In various implementations, the system sends a command for each candidate device associated using the internet protocol (IP) address associated with each candidate device. In some implementations, a single IP address may be shared by multiple network devices. As such, in some implementations, network devices that go through the same gateway and are associated with same IP allow for mass configuration/registration of new devices.

At 304, in response to one or more of the reference devices detecting one or more candidate devices to be onboarded, the system receives one or more responses from one or more of the reference devices that detect one or more candidate devices. In various implementations, each response indicates if one or more of the candidate devices are detected, and identifies the detected candidate device. In some implementations, the system receives a response from a given reference device if the reference device detects at least one candidate, where the response indicates the candidate devices that are detected. As indicated herein, candidate devices that are detected may be referred to as detected candidate devices or detected devices. In some implementations, the system receives a response from a given reference device even if the reference device does not detect any candidates, where the response indicates that no candidate device is detected.

In various implementations, once the system has verified that detectable candidate devices are located in the same site as a reference device, the system may generate a list of devices for automatic configuration in a batch.

At 306, the system generates a list of the detected devices to be onboarded, where the list includes candidate devices that are detected by one or more of the reference devices.

In various implementations, the system omits from the list of detectable devices to be onboarded candidate devices that are not detectable by the one or more references devices. In some implementations, if a given candidate device was once detectable by one or more reference devices but is no longer detectable, the system may remove the given candidate device from the list of detectable devices to be onboarded.

At 308, the system may configure the delectable devices to be onboarded based on the list.

Although the steps, operations, or computations illustrated in FIGS. 2 and 3 may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations provide a reliable propagation method for automatically onboarding multiple new devices (e.g., access points, etc.) located in the same network. Implementations also reduce the amount of information that a user has to provide in order to configure a new network device.

In some implementations, a machine learning model may be used to identify reference devices and/or candidate devices based on characteristics associated with the device. For example, a machine learning model may be used to provide a reliability index for a device, a type of devices, or a class of devices. In some implementations, a machine learning model may be used instead of or in addition to rules, indices, thresholds, etc.

In some implementations, detected physical characteristics of a device, a type or types of devices, or a class of devices may be provided to a machine learning model generator, such as a deep neural network (DNN) machine learning model generator, to construct models that may be used to identify a device. A DNN model transforms inputs using succession calculation layers to produce an output, where each layer contains a number of weights, biases, and activation functions. The calculations may be performed relatively quickly and may be optimized for a particular architecture. A series of time-based inputs may be provided to a classifier so that multiple "snapshots" of detected features may used to identify a device as those features change over time. An open source DNN tool such as Theano may be used to build DNN models.

Instantiations of a DNN model may have a variety of action functions, for example, linear or hyperbolic tangent action functions. In addition to determining activation functions that give the best performance, layer 1 (L1) and layer 2 (L2) regularization functions may be used to improve a DNN model's recognition capability, to penalize large weights and reduce non-linear behavior.

In some implementations, training data for a device is collected. The training data may include one or more feature vectors, where the feature vectors may be or may be based on the detected hardware characteristics described above. The feature vectors may be classified such that a desired output (e.g., which device they are associated with) is provided for the training data. A machine learning system thus may be trained using the feature vectors.

Any suitable machine learning technique may be used instead of or in addition to DNN, including, by way of non-limiting examples, support vector machines, quadratic classifiers, kernel estimation (e.g., k-nearest-neighbor classifiers) and decision trees. Techniques for training may vary, depending on the machine teaming technique used. A result of training is a properly trained machine learning model that is ready to identify a device, a type of device, or a class of devices, or to provide a reliability index for a device or type of device.

In some implementations, communications of a device may be monitored to identify software that is running on the device. For example, the version of a protocol supported by a device may be indicated explicitly by a device in a protocol exchange, or may be inferred based on the data sent by the device. For example, a version of dynamic host configuration protocol (DHCP) or transmission control protocol/ Internet protocol (TCP/IP) may be indicated or inferred in communication with the device. Likewise, a version of transport layer security (TLS) or another encryption protocol may be indicated or may be inferred by the communication exchange with the device. This information may be used in combination with physical characteristics to identify a device.

In some implementations, management information, such as software version information, hardware version information, etc. may be requested from a device. For example, if a device supports simple network management protocol (SNMP), certain information may be requested. This information may be used in combination with physical characteristics to identify a device. In some implementations, a device may provide a management web page that includes software or hardware version information. Responses of a device to queries may be used to identify a device and to determine threat levels.

In some implementations, a device may provide a response to communications to the device. For example, a printer may provide a specific response to a status request made to a port that supports a printing protocol supported by the printer. For example, a printer may provide a response that indicates that the printer is available and ready to receive a print request. A query to that port may provide a response that can be compared to expected responses or previous responses to identify a device.

In some implementations, the types and sizes or content of packets communicated by a device may be monitored determine threat levels. Communication patterns, such as with respect to devices and ports on the network communicated with, the types of packets communicated, the data in those packets, etc. may be used to identify a device. A device characteristic, or threat level associated with a device, may be determined. For example, if a device with different hardware characteristics than expected starts communicating to different addresses, or, for example, conducts a port scan of another device on the network, this may be indicative of a characteristic or a threat level.

In some implementations, data communicated by a device may be used to assist in analysis of hardware characteristics and to determine threat levels. For example, a packet of data sent periodically by the device (whether part of a security protocol or for other purposes) may be monitored. A packet sent at a different time that also has different hardware characteristics may be indicative of a concern.

In some implementations, a "heartbeat" may be used by a device to securely communicate health information and other information, and a correctly authenticated heartbeat may be used to have more confidence in a device even if the device presents irregular hardware characteristics. As such, a heartbeat may be used to determine threat levels. In some implementations, the heartbeat may be secured with encryption, or use hash or other one-way functions to provide authentication.

Figure 4:
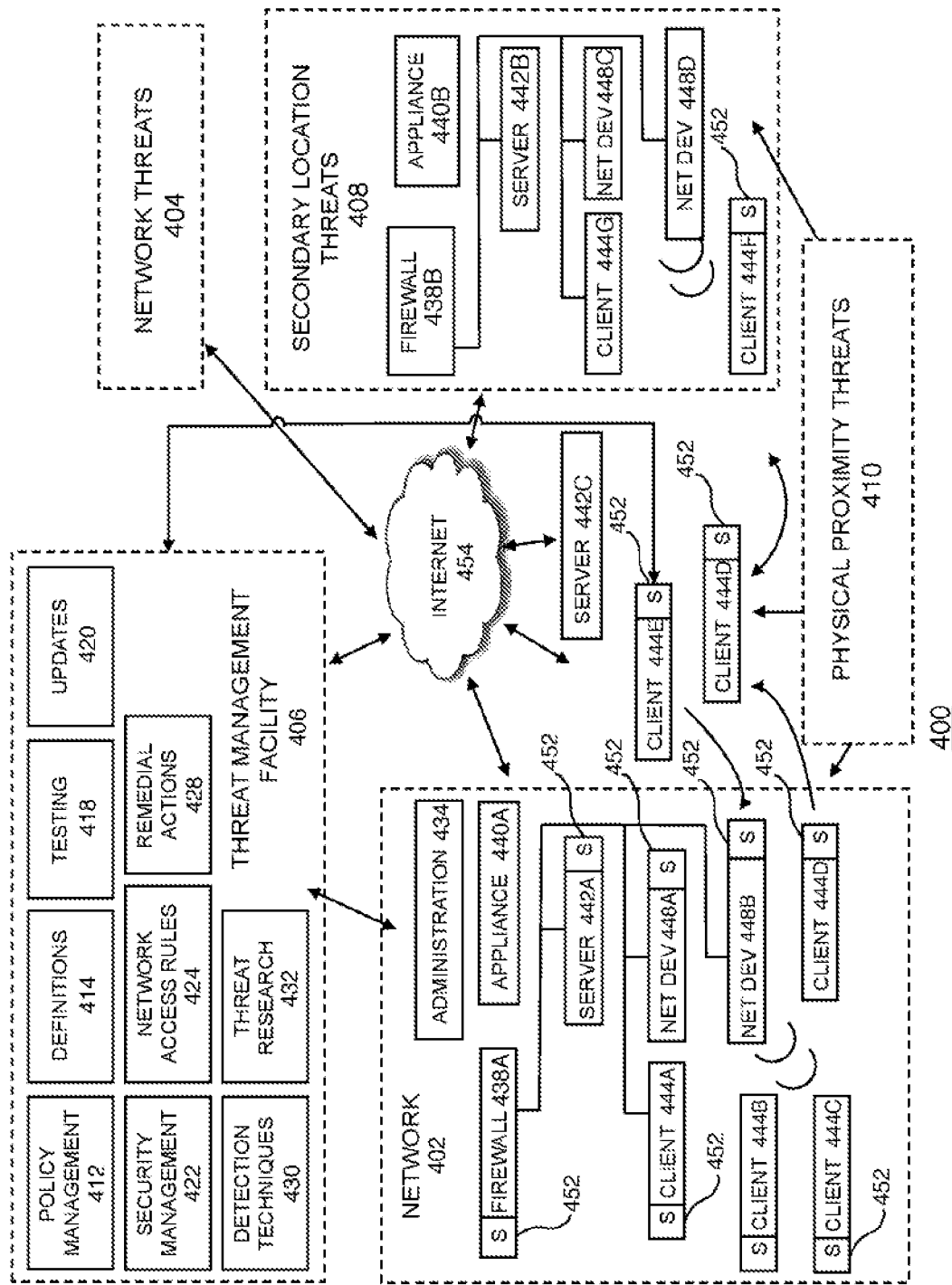
FIG. 4 illustrates a block diagram of an example threat management system, according to some implementations.

FIG. 4 illustrates a block diagram of an example threat management system 400, according to some implementations. In various implementations, the device configuration system 102 may operate in conjunction with or context of threat management system 400.

As shown, in some implementations, the threat management system 400 may include a network 402. As described in more detail herein, various threats to client facilities may come from a variety of sources, such as from network threats 404. In various implementations, a threat management facility 406 may provide protection against such network threats 404, as well as other threats including secondary location threats 408 and physical proximity threats 410. Various threat management system 400 components such as implementations, network 402, threat management facility 406, etc.

In various implementations, the threat management facility 406 provides protection to one or more enterprises, networks, locations, users, businesses, and other network elements against a variety of threats, in a context in which the techniques described above may usefully be deployed. The threat management facility 406 may be used to protect devices and assets (e.g., IoT devices or other devices) from computer-generated and human-generated threats. For example, a corporation, school, web site, homeowner, network administrator, or other entity may institute and enforce one or more policies that control or prevent certain network users (e.g., employees, residents, users, guests, etc.) from accessing certain types of applications, devices, resources generally or in a particular manner. Policies may be created, deployed and managed, for example, through the threat management facility 406, which may update and monitor network devices, users, and assets accordingly.

The threat of malware or other compromise may be present at various points within a network 402 such as laptops, desktops, servers, gateways, communication ports, handheld or mobile devices, IoT devices, and/or firewalls. In addition to controlling or stopping malicious code, a threat management facility 406 may provide policy management to control devices, applications, or users that might otherwise undermine productivity and network performance within the network 402.

The threat management facility 406 may provide protection to network 402 from computer-based malware, including viruses, spyware, adware, trojans, intrusion, spam, policy abuse, advanced persistent threats, uncontrolled access, and the like. In general, the network 402 may be any networked computer-based infrastructure or the like managed by the threat management facility 406, such as an organization, association, institution, or the like, or a cloud-based facility that is available for subscription by individuals. For example, the network 402 may be a corporate, commercial, educational, governmental, or other network, and may include multiple networks, computing resources, and other facilities, may be distributed among more than one geographical location, and may include an administration unit 434, a firewall 438A, an appliance 440A, a server 442A, network devices 448A-B, clients 444A-D (alternately referred to as clients 444), such as IoT devices or other devices. It will be understood that any reference herein to a wireless client device, client device, or client facilities may include the clients 444A-D, and vice-versa.

The threat management facility 406 may include computers, software, or other computing facilities supporting a plurality of functions, such as a security management facility 422, a policy management facility 412, an update facility 420, a definitions facility 414, a network access rules facility 424, a remedial actions facility 428, a detection techniques facility 430, a testing facility 418, a threat research facility 432, and the like. In some implementations, the threat protection provided by the threat management facility 406 may extend beyond the network boundaries of the network 402 to include client 444D (or client facilities) that have moved into network connectivity not directly associated with or controlled by the network 402. Threats to client facilities may come from a variety of sources, such as from network threats 404, physical proximity threats 410, secondary location threats 408, and the like. Clients 444A-D may be protected from threats even when clients 444A D are not directly connected or in association with the network 402, such as when client 444E-F moves in and out of the network 402, for example when interfacing with an unprotected server 442C through the Internet 454, when a client 444F is moving into a secondary location threat 408 network such as interfacing with components 440B, 442B, 448C, 448D that are not protected, and the like.

The threat management facility 406 may use or may be included in an integrated system approach to provide network 402 protection from multiple threats to device resources in multiple of locations and network configurations. The threat management facility 406 may also or instead be deployed as a stand-alone solution. For example, some or all of the threat management facility 406 components may be integrated into a server or servers at a remote location, for example in a cloud computing facility. For example, some or all of the threat management facility 406 components may be integrated into a firewall, gateway, or access point within or at the border of the network 402. In some implementations, the threat management facility 406 may be integrated into a product, such as a third-party product, e.g., through an application programming interface, which may be deployed on endpoints, on remote servers, on internal servers or gateways for a network, or some combination of these.

The security management facility 422 may include a plurality of elements that provide protection from malware to network 402 device resources in a variety of ways including endpoint security and control, email security and control, web security and control, reputation-based filtering, control of unauthorized users, control of guest and non-compliant computers, and the like. The security management facility 422 may include a local software application that provides protection to one or more network 402 devices. The security management facility 422 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 422 may provide email security and control. The security management facility 422 may also or instead provide for web security and control, such as by helping to detect or block viruses, spyware, malware, unwanted applications, and the like, or by helping to control web browsing activity originating from client devices. In some implementations, the security management facility 422 may provide for network access control, which may provide control over network connections. In addition, network access control may control access to virtual private networks (VPN) that provide communications networks tunneled through other networks. The security management facility 422 may provide host intrusion prevention through behavioral based protection, which may guard against known or unknown threats by analyzing behavior before or while code executes. The security management facility 422 may provide reputation filtering, which may target or identify sources of code.

In some implementations, the security management facility 422 may use wireless characteristics to identify a device on the network 402. For example, the security management facility may determine a reliability index value of a device connected via a wireless link to the network 402, for example, an IoT device. Through one or more access points (e.g., firewall 438A) or other sensor (e.g., appliance 440A) in the network 402, the security management facility 422 may monitor RF characteristics of the IoT device to obtain current RF characteristics. The security management facility 422 may compare the current RF characteristics to baseline RF characteristics, and when there is a match between the current RF characteristics and the baseline RF characteristics based on the comparing, adjust the reliability index value to indicate greater reliability, and when there is not a match between the current RF characteristics and the baseline RF characteristics based on the comparing, adjusting the reliability index value to indicate lesser reliability, and when the reliability index value exceeds a threshold value, performing an action to reduce a potential threat of the IoT device to the network. This aspect of the security management facility may also take place on the firewall 438A (e.g., an access point) or appliance 440A.

In general, the security management facility 422 may support overall security of the network 402 using the various techniques described above, optionally as supplemented by updates of malicious code information and so forth for distribution across the network 402.

The administration facility 434 may provide control over the security management facility 422 when updates are performed. Information from the security management facility 422 may also be sent from the enterprise back to a third party, a vendor, or the like, which may lead to improved performance of the threat management facility 406.

The policy management facility 412 may be configured to take actions, such as to block applications, users, communications, devices, and so on based on determinations made. The policy management facility 412 may employ a set of rules or policies that determine network 402 access permissions for a client 444. In some implementations, a policy database may include a block list, a black list, an allowed list, a white list, or the like, or combinations of the foregoing, that may provide a list of resources internal or external to the network 402 that may or may not be accessed by client devices 444. The policy management facility 412 may also or instead include rule-based filtering of access requests or resource requests, or other suitable techniques for controlling access to resources consistent with a corresponding policy.

In some implementations, the policy management facility 412 may include reliability index thresholds for devices, such as IoT devices. The policy management facility 412 may include policies to permit or deny access, to take remedial action, to issue alerts, and so on based on particular reliability index determinations.

The policy management facility 412 may also or instead provide configuration policies to be used to compare and control the configuration of applications, operating systems, hardware, devices, network associated with the network 402. An evolving threat environment may dictate timely updates, and thus an update management facility 420 may also be provided by the threat management facility 406. In addition, the policy management facility 412 may require update management (e.g., as provided by the update facility 420 herein described). In some implementations, the update management facility 420 may provide for patch management or other software updating, version control, and so forth.

The security management facility 422 and the policy management facility 412 may push information to the network 402 and/or a given client 444. The network 402 and/or client 444 may also or instead request information from the security management facility 422 and/or the policy management facility 412, network access rules facilities 442 (e.g., 442A, 442B), or there may be a combination of pushing and pulling of information. In some implementations, the policy management facility 412 and the security management facility 422 management update modules may work in concert to provide information to the network 402 and/or client facility 444 for control of applications, devices, users, and so on.

As threats are identified and characterized, the threat management facility 406 may create updates that may be used to allow the threat management facility 406 to detect and remediate malicious software, unwanted applications, configuration and policy changes, and the like. The threat definition facility 414 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 422 when scanning files or applications within the client facility for the determination of malicious code that may be within the file or application. A definition management facility may include a definition for a neural network or other recognition engine. A definition management facility 414 may provide timely updates of definition files information to the network, client facilities, and the like.

In some implementations, the definition management facility 414 may include default values or baseline values for RF characteristics of devices, such as IoT devices. For example, the definition management facility 414 may include a baseline value for particular RF characteristics of a particular IoT device.

The security management facility 422 may be used to scan an outgoing file and verify that the outgoing file is permitted to be transmitted per the enterprise facility 402 rules and policies. By checking outgoing files, the security management facility 422 may be able to discover malicious code infected files that were not detected as incoming files.

The threat management facility 406 may provide controlled access to the network 402. A network access rules facility 424 may be responsible for determining if a client facility 444 application should be granted access to a requested network resource. In some implementations, the network access rules facility 424 may verify access rights for client facilities 444 to or from the network 402 or may verify access rights of computer facilities to or from external networks. When network access for a client facility is denied, the network access rules facility 424 may send an information file to the client facility, e.g., a command or command file that the remedial actions facility 428 may access and take action upon. The network access rules facility 424 may include one or more databases that may include a block list, a black list, an allowed list, a white list, a reputation list, an unacceptable network resource database, an acceptable network resource database, a network resource reputation database, or the like. The network access rules facility 424 may incorporate rule evaluation. Rule evaluation may, for example, parse network access requests and apply the parsed information to network access rules. The network access rules facility 424 may also or instead provide updated rules and policies to the network 402.

When a threat or policy violation is detected by the threat management facility 406, the threat management facility 406 may perform or initiate remedial action through a remedial actions facility 428. Remedial action may take a variety of forms, such as terminating or modifying an ongoing process or interaction, issuing an alert, sending a warning to a client or administration facility 434 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on a client 444, quarantining a related application (or files, processes or the like), terminating the application or device, isolating the application or device, moving a process or application code to a sandbox for evaluation, isolating a client 444 to a location or status within the network that restricts network access, blocking a network access port from a client 444, reporting the application to an administration facility 434, or the like, as well as any combination of the foregoing.

In some implementations, remedial action may be taken based on a reliability index determination based on RF characteristics of a wireless device.

Remedial action may be provided as a result of a detection of a threat or violation. The detection techniques facility 430 may include tools for monitoring the network or managed devices within the network 402. The detection techniques facility 430 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 406 may detect threats and violations to established policy and may specify the ability to test the system, either at the system level or for a particular computing component. The testing facility 418 may allow the administration facility 434 to coordinate the testing of the security configurations of client facility computing facilities on a network. For example, the administration facility 434 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 434. The administration facility 434 may be able to determine the level of preparedness of clients 444 based on the reported information. Remedial action may be taken for any of clients 444 as determined by the administration facility 434.

The threat management facility 406 may provide threat protection across the network 402 to devices such as clients 444, a server facility 442, an administration facility 434, one or more firewalls 438 (e.g., 438A, 438B), a gateway, one or more network devices 448 (e.g., 448A, 448B) such as hubs and routers, a threat management or other appliance 440 (e.g., 440A, 440B), any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 402, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 108. The endpoint computer security facility 452 may be an application locally loaded onto any corresponding computer platform or computer support component, either for local security functions or for management by the threat management facility 406 or other remote resource, or any combination of these.

The network 402 may include a plurality of client facility computing platforms on which the endpoint computer security facility 452 is installed. A client facility computing platform may be a computer system that is able to access a service on another computer, such as a server facility 442, via a network. The endpoint computer security facility 452 may, in corresponding fashion, provide security in any suitable context such as among a plurality of networked applications, for a client facility connecting to an application server facility 442, for a web browser client facility connecting to a web server facility 442, for an e-mail client facility retrieving e-mail from an Internet 454 service provider's mail storage servers 442 or web site, and the like, as well as any variations or combinations of the foregoing.

The network 402 may include one or more of a variety of server facilities 442, such as application servers, communications servers, file servers, database servers, proxy servers, mail servers, fax servers, game servers, web servers, and the like. A server facility 442, which may also be referred to as a server facility 442 application, server facility 442 operating system, server facility 442 computer, or the like, may be any device(s), application program(s), operating system(s), or combination of the foregoing that accepts client facility connections in order to service requests from clients 444. In some implementations, the threat management facility 406 may provide threat protection to server facilities 442 within the network 402 as load conditions and application changes are made.

A server facility 442 may include an appliance facility 440, where the appliance facility 440 provides specific services to other devices on the network. Simple server facility 442 appliances may also be utilized across the network 402 infrastructure, such as switches, routers, hubs, gateways, print servers, modems, and the like. These appliances may provide interconnection services within the network 402, and therefore may advance the spread of a threat if not properly protected.

A client facility 444 may be protected from threats from within the network 402 using a local or personal firewall, which may be a hardware firewall, software firewall, or combination, that controls network traffic to and from a client. The local firewall may permit or deny communications based on a security policy. Another component that may be protected by an endpoint computer security facility 452 is a network firewall facility 438, which may include hardware or software, in a standalone device or integrated with another network component, that may be configured to permit, deny, or proxy data through a network 402.

The interface between the threat management facility 406 and the network 402, and through the appliance facility 440 to embedded endpoint computer security facilities, may include a set of tools that may be the same or different for various implementations, and may allow each network administrator to implement custom controls. In some implementations, these controls may include both automatic actions and managed actions. The administration facility 434 may configure policy rules that determine interactions. The administration facility 434 may also establish license management, which in turn may further determine interactions associated with licensed applications. In some implementations, interactions between the threat management facility 406 and the network 402 may provide threat protection to the network 402 by managing the flow of network data into and out of the network 402 through automatic actions that may be configured by the threat management facility 406 for example by action or configuration of the administration facility 434.

Client facilities 444 within the network 402 may be connected to the network 402 by way of wired network facilities 448A or wireless network facilities 448B. Mobile wireless facility clients 444, because of their ability to connect to a wireless network access point, may connect to the Internet 454 outside the physical boundary of the network 402, and therefore outside the threat-protected environment of the network 402. Such a client 444, if not for the presence of a locally-installed endpoint computer security facility 452, may be exposed to a malware attack or perform actions counter to network 402 policies. Thus, the endpoint computer security facility 452 may provide local protection against various threats and policy violations. The threat management facility 406 may also or instead be configured to protect the out-of-enterprise facility 402 mobile client facility (e.g., the clients 444) through interactions over the Internet 454 (or other network) with the locally-installed endpoint computer security facility 452. Thus, mobile client facilities that are components of the network 402 but temporarily outside connectivity with the network 402 may be provided with the threat protection and policy control the same as or similar to client facilities 444 inside the network 402. In addition, mobile client facilities 444 may receive the same interactions to and from the threat management facility 406 as client facilities 444 inside the enterprise facility 402, such as by receiving the same or equivalent services via an embedded endpoint computer security facility 452.

Interactions between the threat management facility 406 and the components of the network 402, including mobile client facility extensions of the network 402, may ultimately be connected through the Internet 454 or any other network or combination of networks. Security-related or policy-related downloads and upgrades to the network 402 may be passed from the threat management facility 406 through to components of the network 402 equipped with the endpoint computer security facility 452. In turn, the endpoint computer security facility 452 components of the enterprise facility 400 may upload policy and access requests back across the Internet 454 and through to the threat management facility 406. The Internet 454 however, is also the path through which threats may be transmitted from their source, and an endpoint computer security facility 452 may be configured to protect a device outside the network 402 through locally-deployed protective measures and through suitable interactions with the threat management facility 406.

Thus, if the mobile client facility were to attempt to connect into an unprotected connection point, such as at a secondary location 408 that is not a part of the network 402, the mobile client facility 444 may be required to request network interactions through the threat management facility 406, where contacting the threat management facility 406 may be performed prior to any other network action. In some implementations, the client facility's 444 endpoint computer security facility 452 may manage actions in unprotected network environments such as when the client facility (e.g., client 444F) is in a secondary location 408, where the endpoint computer security facility 452 may dictate what applications, actions, resources, users, etc. are allowed, blocked, modified, or the like.

The secondary location 408 may have no endpoint computer security facilities 452 as a part of its components, such as its firewalls 438B, servers 442B, clients 444G; hubs and routers 448C-D, and the like. As a result, the components of the secondary location 408 may be open to threat attacks, and become potential sources of threats, as well as any mobile enterprise facility clients 444B-F that may be connected to the secondary location's 408 network. In this instance, these components may now unknowingly spread a threat to other connected to the network 402.

Some threats do not come directly from the Internet 454. For example, a physical proximity threat 410 may be deployed on a client device while that device is connected to an unprotected network connection outside the enterprise facility 402, and when the device is subsequently connected to a client 444 on the network 402, the device can deploy the malware or otherwise pose a threat. In some implementations, the endpoint computer security facility 452 may protect the network 402 against these types of physical proximity threats 410, for instance, through scanning any device prior to allowing data transfers, through security validation certificates, through establishing a safe zone within the network 402 to receive data for evaluation, and the like.

Figure 5:
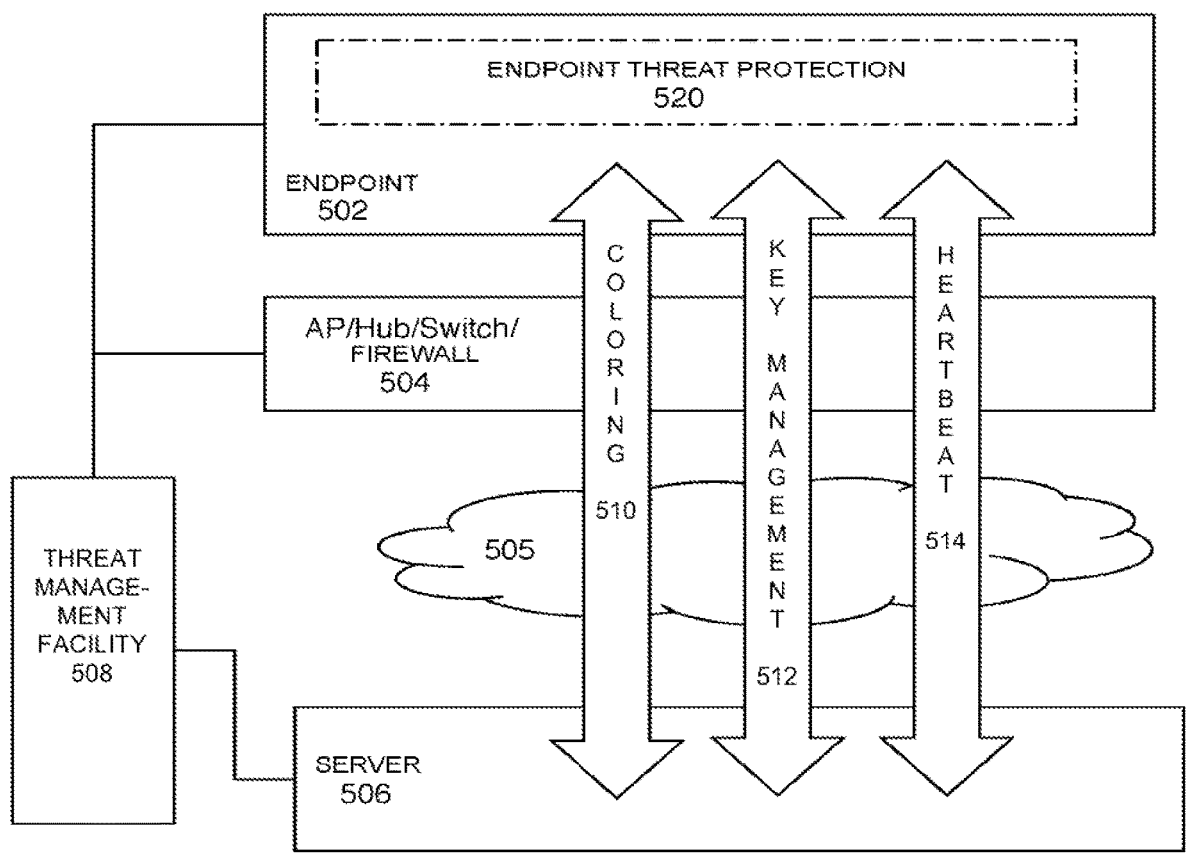
FIG. 5 illustrates a block diagram of an example threat management system, according to some implementations.

FIG. 5 illustrates a block diagram of an example threat management system 500, according to some implementations. In various implementations, the device configuration system 102 may operate in conjunction with or context of threat management system 500.

In general, the threat management system 500 may include an endpoint 502, a laptop, or a device such as an IoT device, an AP or hub or switch or firewall 504, a server 506, and a threat management facility 508 in communication with one another directly or indirectly through a data network 505. In various implementations, each of the entities depicted in FIG. 5, may be implemented on one or more computing devices such as the computing device described herein with reference to FIG. 6.

A number of systems may be distributed across these various components to support threat management, for example, including a coloring system 510, a key management system 512 and a heartbeat system 514, each of which may include software components executing on any of the foregoing system components, and each of which may communicate with the threat management facility 508 or an endpoint threat protection system 520 executing on the endpoint 502, on the AP/hub/switch/firewall 504, or on the server 506 to support improved threat detection and remediation.

The coloring system 510 may be used to label or 'color' software objects for improved tracking and detection of potentially harmful activity. The coloring system 510 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy. A color of a device may be considered a characteristic of a device. A color of a device may be a threat level, indicative of a threat level, or used to determine a threat level.

The key management system 512 may support management of keys for the endpoint 502 in order to selectively permit or prevent access to content on the endpoint 502 on a file-specific basis, a process-specific basis, an application-specific basis, a user-specific basis, or any other suitable basis in order to prevent data leakage, and in order to support more fine-grained and immediate control over access to content on the endpoint 502 when a security compromise is detected. Thus for example, if a particular process executing on the endpoint is compromised, or potentially compromised or otherwise under suspicion, keys to that process may be revoked in order to prevent. e.g., data leakage or other malicious activity. In implementations, keys on device may be revoked based on one or more reliability index values, the meeting of one or more reliability index thresholds, the rate of change of one or more reliability index values, etc. A key status of a device may be considered a characteristic of a device. A key status of a device may be a threat level, indicative of a threat level, or used to determine a threat level.

The heartbeat system 514 may be used to provide periodic or aperiodic information from an endpoint about system health, security, status, etc. A heartbeat may be encrypted or plaintext, or some combination of these, and may be communicated unidirectionally (e.g., from the endpoint 502 to the threat management facility 508) or bidirectionally (e.g., between the endpoint 502 and the server 506, or any other pair of system components) on a useful schedule.

In implementations, the AP/hub/switch/firewall 504 may use the heartbeat 514 to report a potential or actual compromise of a device based, for example, on a color of the device, or based on one or more reliability index values, the meeting of one or more reliability index thresholds, the rate of change of one or more reliability index values, etc. The heartbeat 514 from the AP/hub/switch/firewall 504 may be communicated to the server 506, for example, and administrative server or directly or indirectly to the threat management facility 508. If the endpoint device 502 has the endpoint threat protection system 520, the endpoint threat protection system 520 may be used to further investigate the status, or to take remedial measures, again by communication using the secure heartbeat system 514. Data communicated in a heartbeat may be considered a characteristic of a device. Data communicated in a heartbeat may be a threat level, indicative of a threat level, or used to determine a threat level.

In general, these various monitoring and management systems may cooperate to provide improved threat detection and response. For example, the coloring system 510 may be used to evaluate when a particular device is potentially compromised (e.g., threat level), and a potential compromise may be confirmed based on data received from the heartbeat system 514 from the same or another device or an interrupted heartbeat from the heartbeat system 514. The key management system 512 may be used to revoke keys to a process or to a device so that no further files can be opened, deleted or otherwise modified. The AP/hub/switch may take one or more of the measures described (e.g., VLAN assignment, bandwidth, types of data, airtime fairness allocation, steering). More generally, the cooperation of these systems enables a wide variety of reactive measures that can improve detection and remediation of potential threats to an endpoint device or a network. For example, the combination of a key removal and a VLAN assignment may eliminate the possibility of a malware attack on a network even while allowing the device to function as expected.

Figure 6:
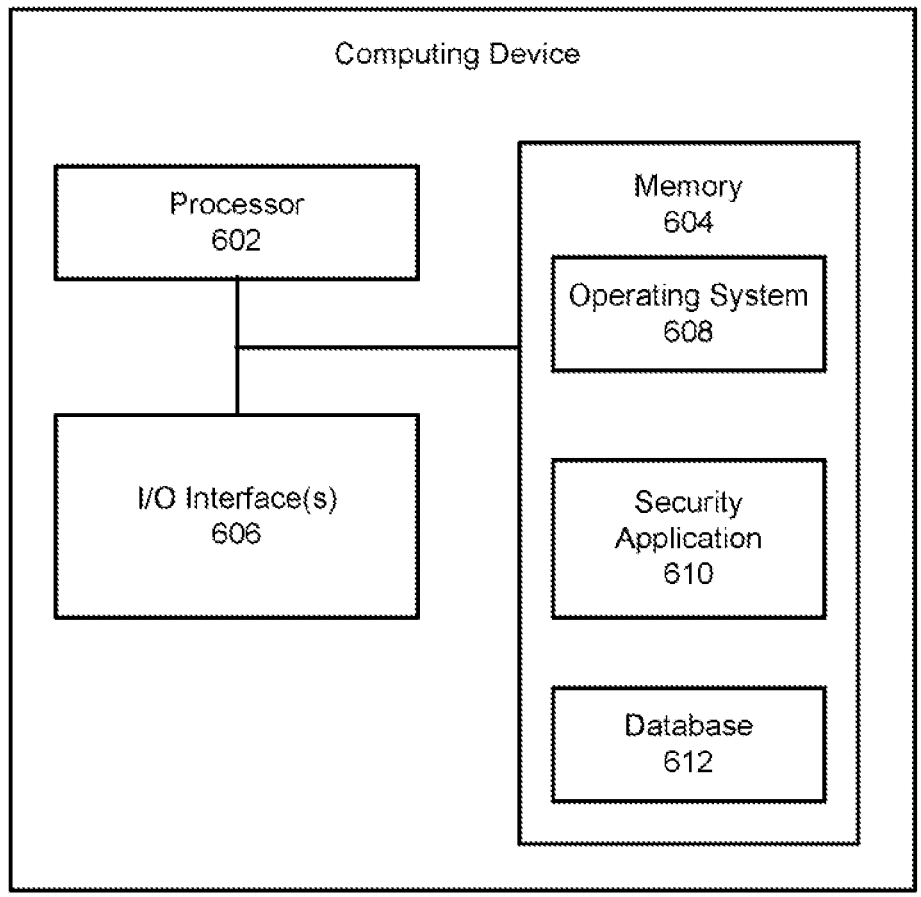
FIG. 6 illustrates a block diagram of an example computing device, which may be used for some implementations described herein.

FIG. 6 illustrates a block diagram of an example computing device 600, which may be used for some implementations described herein. For example, the computing device 600 may be used to implement various devices of FIGS. 1, 4, and 5, as well as to perform implementations described herein in connection with FIGS. 2 and 3. In some implementations, the computing device 600 includes one or more processors 602, non-transitory computer readable medium or memory 604, I/O interface devices 606 (e.g., wireless communications, etc.) and a network interface 608. The computer readable medium 604 may include an operating system 608, a security application 610 for detecting a security attack using physical communication layer characteristics and a data section 612 (e.g., for storing baseline data, reliability index data, etc.).

In operation, the processor 602 may execute the application 610 stored in the computer readable medium 604. The application 610 may include software instructions that, when executed by the processor, cause the processor to perform operations for detecting a security attack using physical communication layer characteristics in accordance with the present disclosure (e.g., performing one or more of 502-508 described herein).

The application program 610 may operate in conjunction with the data section 612 and the operating system 608. The device 600 may communicate with other devices (e.g., a wireless access point) via the I/O interfaces 606.

It will be appreciated that the modules, processes, systems, and sections described above may be implemented in hardware, hardware programmed by software, software instructions stored on a non-transitory computer readable medium or a combination of the above. A system as described above, for example, may include a processor configured to execute a sequence of programmed instructions stored on a non-transitory computer readable medium. For example, the processor may include, but not be limited to, a personal computer or workstation or other such computing system that includes a processor, microprocessor, microcontroller device, or includes control logic including integrated circuits such as, for example, an application specific integrated circuit (ASIC), a field-programmable gate array (FPGA), etc. The instructions may be compiled from source code instructions provided in accordance with a programming language such as Java, C, C++, C#, net, assembly or the like. The instructions may also include code and data objects provided in accordance with, for example, the Visual Basic™ language, or another structured or object-oriented programming language. The sequence of programmed instructions, or programmable logic device configuration software, and data associated therewith may be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random access memory (RAM), flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for implementations above may be distributed across multiple computers or systems or may be co-located in a single processor or system. Example structural implementation alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Implementations of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field programmable gate array (FPGA), programmable array logic (PAL), or the like. In general, any processor capable of implementing the functions or steps described herein may be used for implementations of the method, system, or a computer program product (software program stored on a non-transitory computer readable medium).

Furthermore, implementations of the disclosed method, system, and computer program product (or software instructions stored on a non-transitory computer readable medium) may be readily implemented, fully or partially, in software using, for example, object or object-oriented software development environments that provide portable source code that may be used on a variety of computer platforms. Alternatively, implementations of the disclosed method, system, and computer program product may be implemented partially or fully in hardware using, for example, standard logic circuits or a very-large-scale integration (VLSI) design. Other hardware or software may be implemented depending on the speed and/or efficiency requirements of the systems, the particular function, and/or particular software or hardware system, microprocessor, or microcomputer being utilized. The method, system, and computer program product may be implemented in hardware and/or software using any known or later developed systems or structures, devices and/or software by those of ordinary skill in the applicable art from the function description provided herein and with a general basic knowledge of the software engineering and computer networking arts.

While the disclosed subject matter has been described in conjunction with a number of implementations, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Moreover, implementations of the disclosed method, system, and computer readable media (or computer program product) may be implemented in software executed on a programmed general purpose computer, a special purpose computer, a microprocessor, a network server or switch, or the like.

What is claimed is:

1. A computer-implemented method comprising:
   receiving, at a device configuration system, a request from a candidate device to be onboarded on a network associated with the device configuration system, wherein the candidate device is one of:
      an access point, hub, switch, or firewall, or a combination device thereof;
   triggering, al the device configuration system and based on the received request, an indication of automatic device onboarding activation, wherein the indication includes identification information of the candidate device;
   receiving, at the device configuration system, a selection of a reference device that is one of:
      a configured access port, hub, switch, or firewall, or a combination device thereof;
   transmitting, by the device configuration system, an encrypted temporary token to the candidate device;
   directing, by the device configuration system, the candidate device to use a link-local protocol to connect to the reference device using the encrypted temporary token;
   receiving, at the device configuration system, a registration request from the candidate device, wherein the registration request includes a validation token, wherein the validation token is generated based on validation of the encrypted temporary token; and
   in response to receiving the registration request, obtaining, at the device configuration system, one or more automatic configuration parameters from the reference device; and
   configuring, by the device configuration system, the candidate device using the one or more automatic configuration parameters obtained from the reference device.

2. The method of claim 1, wherein the reference device is a configured access point located in network proximity to the candidate device.

3. The method of claim 1, wherein the reference device is a configured access point located in geographic proximity to the candidate device.

4. The method of claim 1, wherein the reference device implements a custom protocol, and wherein the reference device is configured as a trust broker.

5. The method of claim 1, wherein the one or more automatic configuration parameters comprise tenant information, wireless local area network (WLAN) configuration, security configuration, firmware version and package, and signal strength.

6. The method of claim 1, wherein the one or more automatic configuration parameters include assigned networks.

7. The method of claim 1, further comprising:
   determining a reliability index value of the reference device, wherein the reliability index value represents reliability of the reference device and is based on a comparison of one or more current radio frequency (RF) characteristics of the reference device and one or more baseline RF characteristics of the reference device; and
   when the reliability index value exceeds a threshold value, performing an action to reduce a potential threat to a network.

8. A device configuration system comprising:
   one or more processors coupled to a non-transitory computer-readable medium having stored thereon instructions that, when executed by the one or mare processors, cause the one or more processors to perform operations comprising:
      receiving, a request from a candidate device to be onboarded on
   a network associated with the device configuration system,
      wherein the candidate device is one of:
         an access point, hub, switch, or firewall, or a combination device thereof;

triggering, based on the received request, an indication of automatic device onboarding activation, wherein the indication includes identification information of the candidate device;
receiving, a selection of a reference device that is one of:
a configured access point, hub, switch, or firewall, or a combination device thereof;
transmitting, an encrypted temporary token to the candidate device;
directing, the candidate device to use a link-local protocol to connect to the reference device using the encrypted temporary token;
receiving, a registration request from the candidate device, wherein the registration request includes a validation token, wherein the validation token is generated based on validation of the encrypted temporary token; and
in response to receiving the registration request, obtaining, one or more automatic configuration parameters from the reference device; and
configuring, the candidate device using the one or more automatic configuration parameters obtained from the reference device.

9. The device configuration system of claim 8, wherein the reference device is a configured access point located in network proximity to the candidate device.

10. The device configuration system of claim 8, wherein the reference device is a configured access point located in geographic proximity to the candidate device.

11. The device configuration system of claim 8, wherein the reference device implements a custom protocol, and wherein the reference device is configured as a trust broker.

12. The device configuration system of claim 8, wherein the candidate device to be onboarded is an access point.

13. The device configuration system of claim 8, wherein the one or more automatic configuration parameters comprise tenant information, wireless local area network (WLAN) configuration, security configuration, firmware version and package, and signal strength.

14. The device configuration system of claim 8, wherein the operations further include:
determining a reliability index value of the reference device, wherein the reliability index value represents reliability of the reference device and is based on a comparison of one or more current radio frequency (RF) characteristics of the reference device and one or more baseline RF characteristics of the reference device; and
when the reliability index value exceeds a threshold value, performing an action to reduce a potential threat to a network.

15. A non-transitory computer-readable medium having stored thereon instructions that, when executed by one or mare processors, cause the one or More processors to perform operations comprising:
receiving, a request from a candidate device to be onboarded on a network,
wherein the candidate device is one of:
an access point, hub, switch, or firewall, or a combination device thereof;
triggering, based on the received request, an indication of automatic device onboarding activation, wherein the indication includes identification information of the candidate device;
receiving, a selection of a reference device that is one of:
a configured access point, bub, switch, or firewall, or a combination device thereof;
transmitting, an encrypted temporary token to the candidate device;
directing, the candidate device to use a link-local protocol to connect to the reference device using the encrypted temporary token;
receiving, a registration request from the candidate device, wherein the registration request includes a validation token, wherein the validation token is generated based on validation of the encrypted temporary token; and
in response to receiving the registration request, obtaining, one or more automatic configuration parameters from the reference device; and
configuring, the candidate device using the one or more automatic configuration parameters obtained from the reference device.

16. The non-transitory computer-readable medium of claim 15, wherein the reference device is a configured access point located in network proximity to the candidate device.

17. The non-transitory computer-readable medium of claim 15, wherein the reference device is a configured access point located in geographic proximity to the candidate device.

18. The non-transitory computer-readable medium of claim 15, wherein the reference device implements a custom protocol, and wherein the reference device is configured as a trust broker.

19. The non-transitory computer-readable medium of claim 15, wherein the one or more automatic configuration parameters comprise tenant information, wireless local area network (WLAN) configuration, security configuration, firmware version and package, and signal strength.

20. The non-transitory computer-readable medium of claim 15, wherein the one or more automatic configuration parameters include assigned networks.

* * * * *